Nov. 7, 1961 B. A. PROCTOR 3,008,012

MAGNETIC SOUND REPRODUCTION

Filed Jan. 25, 1957 3 Sheets-Sheet 1

INVENTOR
BARTON A. PROCTOR
BY
Moses, Nolte, & Nolte
ATTORNEY

MAGNETIC SOUND REPRODUCTION

Filed Jan. 25, 1957 3 Sheets-Sheet 2

INVENTOR
BARTON A. PROCTOR
BY Moses, Nolte & Nolte
ATTORNEYS

Nov. 7, 1961 B. A. PROCTOR 3,008,012

MAGNETIC SOUND REPRODUCTION

Filed Jan. 25, 1957 3 Sheets-Sheet 3

INVENTOR
BARTON A. PROCTOR
BY
Moses, Moses, & Nolte
ATTORNEYS

United States Patent Office 3,008,012

Patented Nov. 7, 1961

3,008,012

MAGNETIC SOUND REPRODUCTION

Barton A. Proctor, Larchmont, N.Y., assignor, by direct and mesne assignments, to Proctor Dictating Machine Corporation, New York, N.Y., a corporation of New York Filed Jan. 25, 1957, Ser. No. 636,305
8 Claims. (Cl. 179—100.2)

The present invention relates to magnetic sound reproduction and particularly to the packaging and playing of magnetic tape records.

Present magnetic tape recording and reproducing machines require a complex operating procedure. In order to play a record, the reel containing the record must be mounted on the machine. Then the tape is threaded over its prescribed path in juxtaposition to the magnetic pick-up head or heads and over a set of pulleys or equivalent devices. The end of the tape is then fastened to a take-up reel. The threading of the tape and the attachment thereof to the take-up reel requires a considerable amount of time. These operations may entail appreciable difficulty to an inexperienced operator. The excessive amount of handling required increases the likelihood of tearing or other impairment of the tape. The time and effort required to operate magnetic tape recording and reproducing machines has limited their utility.

An object of the present invention is to provide a magnetic tape reproducing apparatus which shall be inexpensive and simple in its operation so that a magnetic tape record can be placed in operating condition as simply as is a phonograph record.

A second object of the invention is to provide safe handling of magnetic tape records by housing each record permanently in a substantially closed casing from which it need not be removed even while being played.

Still another object of the invention is to provide a magnetic tape reproducing apparatus having a minimum number of elements, which elements are substantially fault-free and have an indefinite lifetime.

According to the invention, a main casing is provided having an electric motor drive for spinning the reels, and one or more magnetic pick-up heads, as well as the necessary controls for producing the several required operations. The motor drives a shaft which terminates in a roller drive element positioned in register with an opening in one wall of the main casing and also in register with an opening in one wall of a record container. The magnetic heads are located in openings in another wall of the casing.

The record container is adapted to be mounted on the main casing and locked thereto in operative position. The record container includes a pair of reels mounted therein and is driven by means substantially completely contained within the record container and connected to each of the reels. The reels have freely turning shafts so as to allow alternate direction motion. The magnetic tape record is wound about the reels and threaded so that a portion thereof will be held against the magnetic pick-up head when the record assembly is locked in position. The magnetic tape record is driven by means extending within an opening of the record container during normal record operation. Thus, in accordance with the invention, it is merely necessary to mount the record container on the main casing in order to play a record. If it is desired to substitute another record, it is only necessary to remove one record container and place another one on the main casing.

The invention will be fully understood and many other objects and advantages thereof will become apparent from the following description and drawing in which.

Figure 1:
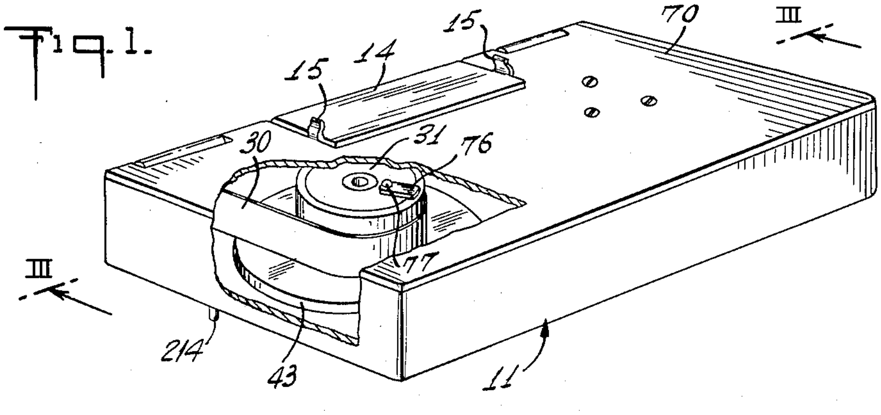
FIG. 1 is a perspective view of the record container.
Figure 2:
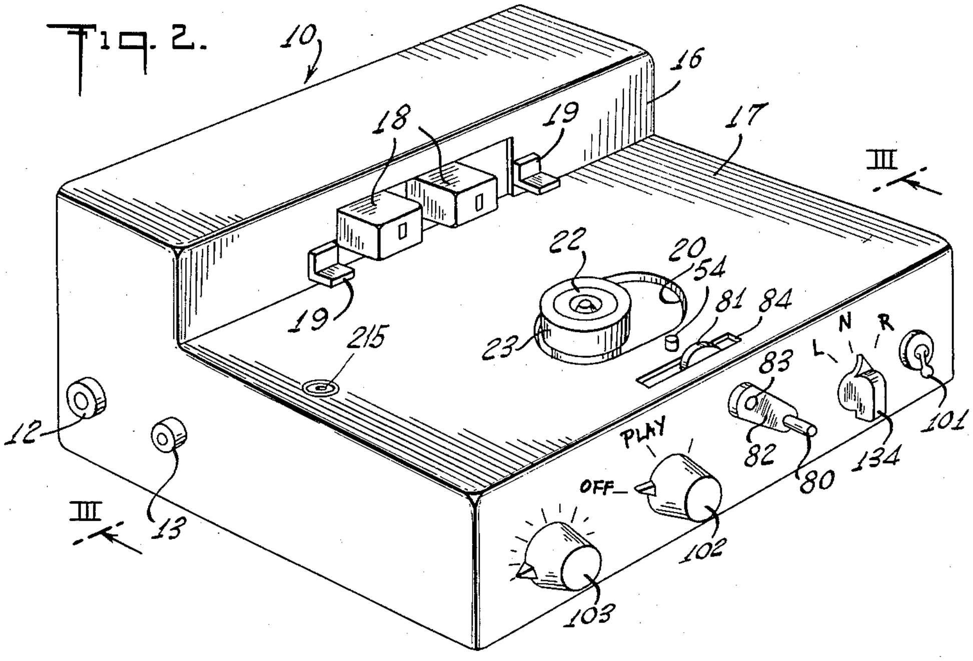
FIG. 2 is a perspective view of the reproducer with the record container removed.

Referring to the drawing, there is shown a main casing 10 on which is mounted a record container or casing 11. The main casing 10 is supplied with power through power cord inlet 12 and is adapted to be connected to a suitable amplifier and loud speaker through a cable outlet 13. The amplifier and loud speaker for the recording apparatus may be those of a radio receiver or phonograph. All manual controls for the record player may be mounted on the front panel (FIG. 2). Each record container 11 may be plainly marked to indicate the contents thereof. Record casing 11 is provided with a pivoted door 14 having lateral clips 15 for enabling it to be snapped shut. Door 14 is open when it is necessary to expose the tape passing the magnetic pick-up heads during operation.

The main casing 10 has a recess bounded by walls 16 and 17 and the recess is of sufficient size to accommodate the record casing 11. Vertical wall 16 is provided with a cut out portion through which one or more magnetic heads 18 extend. There is also mounted on wall 16 a pair of brackets 19, the lower portions of which are slightly above the horizontal wall 17. Brackets 19 cooperate with slots in the record casing 11 for positioning the latter on main casing 10. When the mounting is effected, the opening 20, FIG. 2, will be coincident with a similar opening 20*a* (FIG. 4) in the bottom wall 21 of the record casing 11 itself. This will allow the drive roller 22, with its frictional rim 23, to protrude through this coincident opening in the bottom wall of the record casing 11 in such a manner so as to engage the reels and drive the reels in a manner to be described later.

Figure 3:
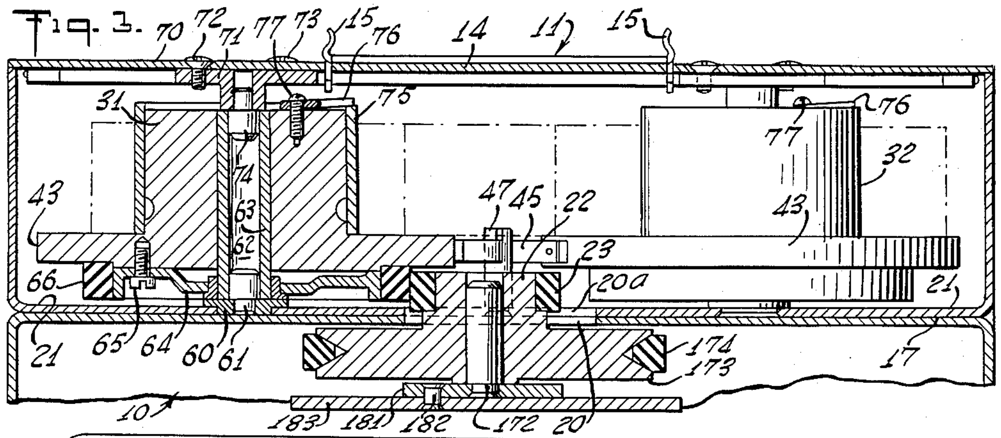
FIG. 3 is a sectional view of the reproducer taken through line III—III of FIGS. 1 and 2.
Figure 4:
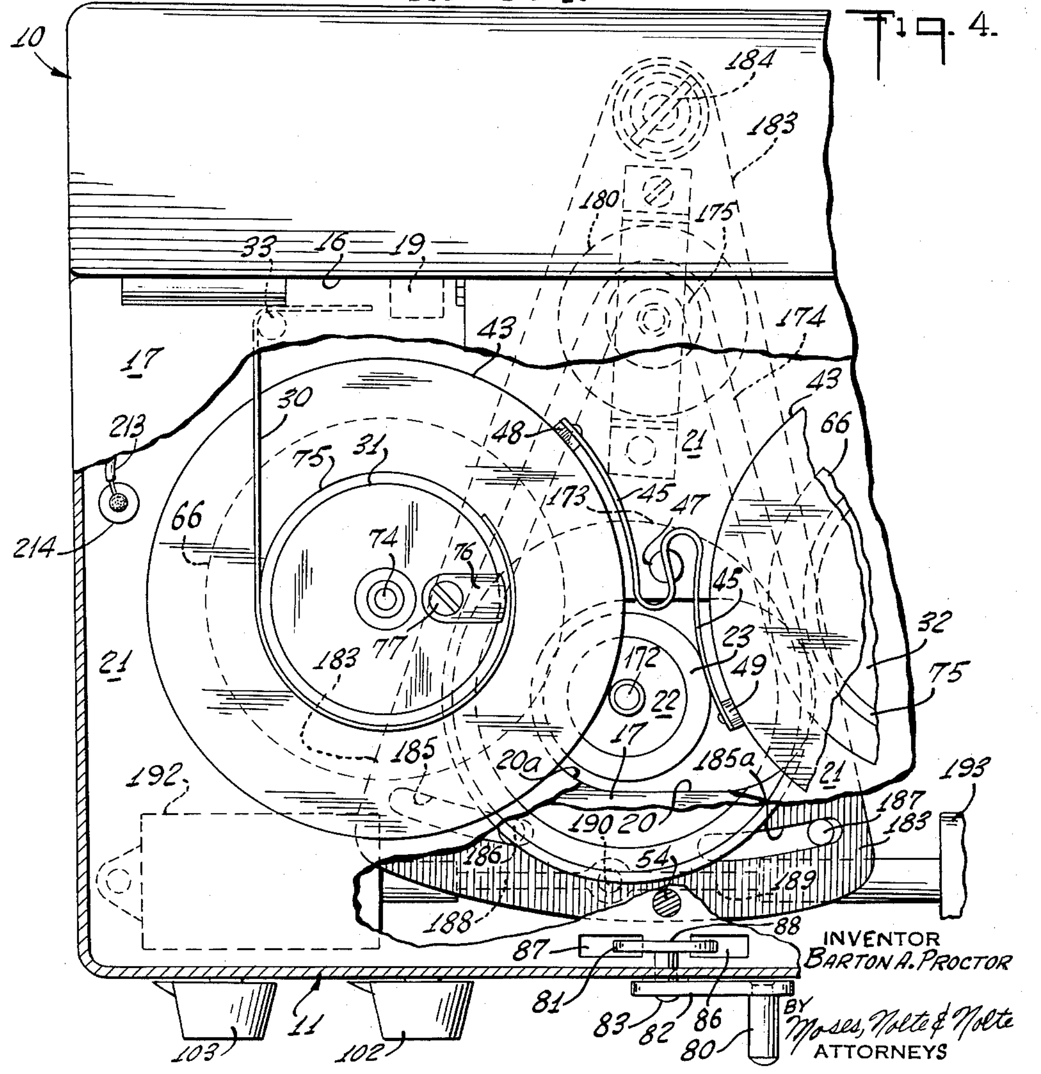
FIG. 4 is a top view of the assembled invention.
Figures 5, 6:
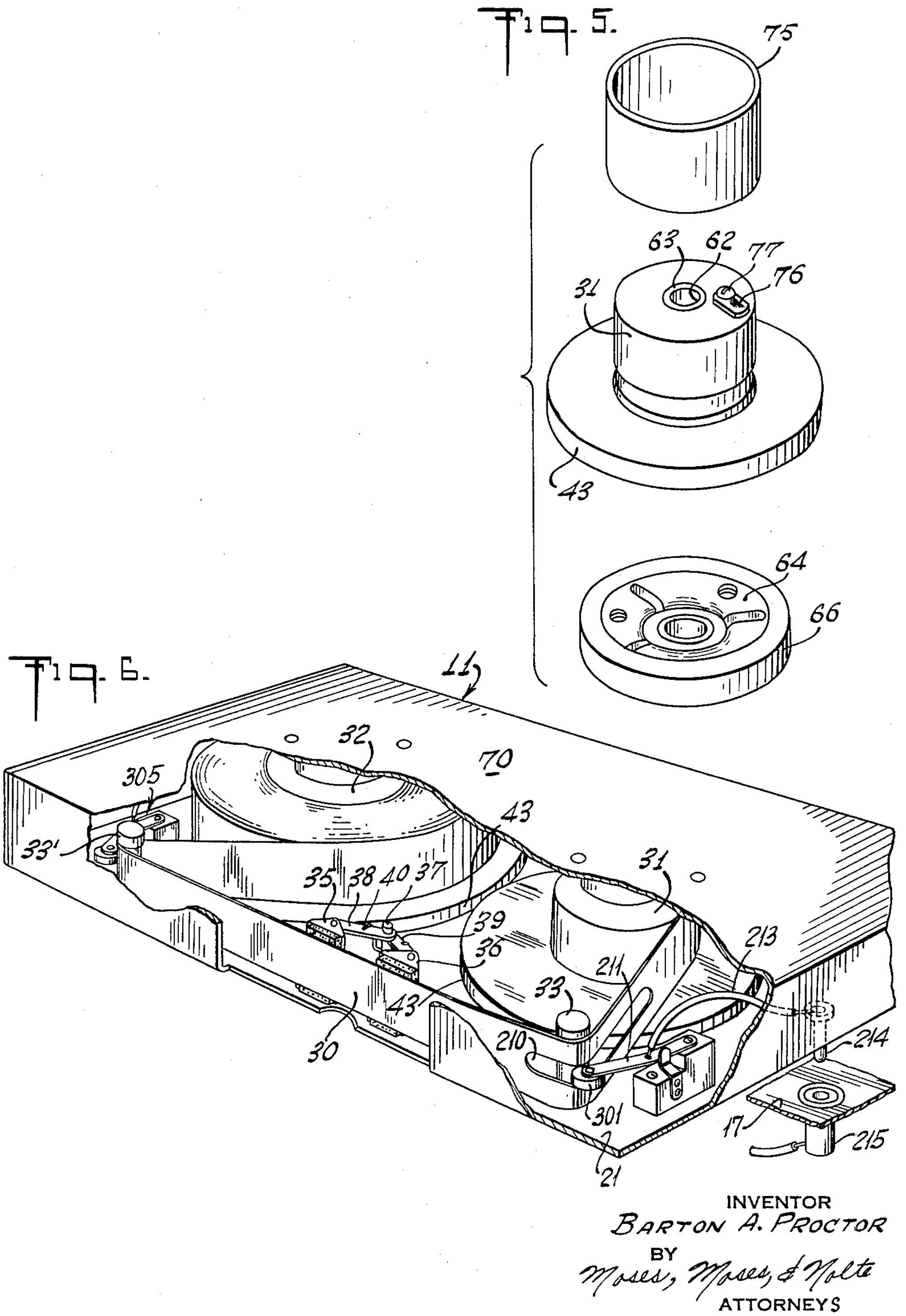
FIG. 5 is a perspective view of the component parts of the reel assembly unit.
FIG. 6 is a perspective view of the record container, similar to that of FIG. 1.

Within the record casing 11, the magnetic tape 30 is wound on a pair of reels 31 and 32, FIG. 3, and over a series of posts 33, 33' so that the tape 30 contacts the magnetic pick-up heads 18. Only one of these pulleys is indicated in FIG. 4, it being understood that the other pulley is similarly located with respect to reel 32, as shown in FIG. 6. The tape is held slidably against magnetic heads 18 by a pair of felt covered shoes 35 and 36, (FIG. 6) which are mounted within the record casing. The shoes are pivotally connected to a post 37 by links 38 and 39 which are provided with a spring 40 for urging the shoes towards magnetic heads 18 when the record casing is properly positioned on the main casing.

When the record casing 11 is not in its operative position on main casing 10, the reels 31 and 32 must be prevented from freely rotating and thereby unravelling the magnetic tape. If this were not done, the magnetic tape might unravel to such an extent that when the record casing is placed in operative position and the reels begin to rotate, they might acquire sufficient velocity to break the tape or to tangle and twist it. The reels are secured against rotation by means of flat spring 45, FIG. 4, which is seated at its center portion through slotted post 47 which, by welding or other conventional means, is connected to the bottom wall 21 of record casing 11. The ends of spring 45 bear against the outwardly flanged portions 43 of the rotating reels 31 and 32 and are provided with suitable cushioning pads 48 and 49 which may be formed of felt, for example. These cushioning pads provide the drag friction to prevent the free rotation of reels 31 and 32. Thus the reels are always held securely against free rotation until the record case is mounted in playing position and the reels are force driven by the motor 180 itself.

A pin 54 is further provided on the wall 17 of the main casing 10 to insure the proper positioning of the record casing 11 on the main casing (FIG. 2). This positioning will insure that the opening 20 in the wall 17 of the main casing, is coincident with the similar opening 20a in the bottom wall 21 of the record casing when mounted for use.

The manner in which the reels 31 and 32 are freely rotatably mounted inside of record casing 11 may best be seen in FIG. 3. Since the two reels are identical only the reel assembly 31 will be herein described. A bearing 60, whose upper face is a bearing surface, is welded or by other suitable means fixed to the bottom wall 21 of record casing 11. A bearing stud 61 projects upwardly into the hole 62 of the reel 31. The periphery of opening 62 has a bushing 63 of suitable material to allow for free frictionless rotation of the reel about the bearing stud 61. The bearing 60 further supports a second bearing 64. The bearing 64 by means of screws 65, only one of which is shown, is fastened to the lower portion of peripheral flange 43 integral with reel 31. About the extremity of the bearing 64 is a frictional rim 66 of suitable material adapted to be engaged by the drive means. To the top wall 70 of record casing 11 is fixed a bearing member 71 by means of screws 72, 73, only two being shown. This bearing member carries a bearing stud 74 which extends downwardly into the opening 62 of reel 31. This bearing stud 74 acting in cooperation with the bearing stud 61, forms the axis about which the reel 31 rotates.

A sleeve 75 is provided so that its inner surface circumferentially engages the reel 31. This sleeve is placed around the reel 31 to rest upon the flange 43, and is held in place by means of snap spring 76. The snap spring is affixed to the reel 31 by means of screw 77. In operation, the sleeve 75 is held in tight engagement with the reel 31 by means of the snap spring 76, and the tape is wound around the sleeve 75. Should it be desired to remove the tape from the record casing, the top cover 70 is first removed. By rotation of the snap spring 76 off the sleeve 75, the sleeve 75 can be lifted off. The tape, wrapped around the sleeve is thereby removed at the same time, within the sleeve, from the record casing 11.

Record casing 11, after being properly positioned on the main casing 10 and centered by pin 54, is locked in position by a latch 81 which is in the form of a crank and is pivoted on shaft 83 (FIG. 4). A handle 80 extending from the front panel of main casing 10 is adapted to turn the latch 81 into its locking position. As the handle 80 is turned, the hook of latch 81 rotates through the opening 84 of the walls 17 and through the openings 86 and 87 in the wall 21 of the record casing 11. Latch 81 thus engages the intermediate portion 88 of wall 21, locking the record casing 11 to the main casing 10 in their proper relative positions. The front panel of casing 10 may also be provided with a power switch 101 and an "off"-"play" switch 102 connected in series with the motor 180. There is also provided a volume control 103 of any suitable kind such as a potentiometer connected across the output of magnetic heads 18.

The drive mechanism which provides for the rotation of the reels in alternate manner is shown in FIGS. 3 and 4, where the frictional rim 23 engages the frictional rim 66 of reel 31. It is, however, adapted to engage the corresponding frictional rim 66 on reel 32 when so positioned by one of solenoids 192 or 193.

The drive wheel 22 is affixed, with pulley 173, to stub shaft 172. Pulley 173 is connected by belt 174 to another pulley 175 on the shaft of motor 180. The motor 180 is mounted by conventional means on the bottom wall of the main casing 10. Shaft 172 terminates in a flange 181 which is affixed by rivets 182 to shift plate 183. Plate 183 is pivoted on an axle 184 and is provided with arcuate slots 185 and 185a into which a pair of pins 186 and 187 extend. The pins 186 and 187 are supported on the bottom plate of the main casing 10 as shown in FIG. 4. Plate 183 is attached to a pair of links 188 and 189 by the pin 190. Links 188 and 189 are connected to the armatures of the solenoids 192 and 193. Either of these solenoids may be replaced by a mechanically operable spring or equivalent device.

In operation, the links 188 and 189 will be moved by energizing of either solenoid 192 or 193, respectively. These links act on a pin 190, integrally fastened to the shift plate 183, to move the plate and the affixed drive wheel 22 into a position where it will engage either the reel 31 or the reel 32. The drive wheel will then drive that reel so as to wind the recording tape around the reel engaged. It is therefore seen from FIG. 4 that if the reel 31 is driven by wheel 22 rotating in a clockwise direction, the tape will be wound around that reel over posts 33 from the reel 32. When the solenoid 193 is activated, by means of link 189, the shifter plate 183 with roller drive 22, will be shifted in a direction towards the reel 32 to engage the reel 32 and be disengaged from the reel 31. It therefore follows that owing to the tape path as shown in FIG. 6 the reel 32 will then wind up the tape and withdraw it from reel 31. This provides for the alternate playing of two recording tracks through the magnetic heads 18.

The mechanism which automatically re-positions the drive wheel, so as to reverse the direction of the drive for the magnetic tape, operates to energize the solenoids 192 or 193 and activates the links 188 or 189 to re-position wheel 22 hereinbefore described.

At the end of a recording in order to re-position the drive means, the tape 30 (FIG. 6) is provided near one of its ends with a longitudinal slot 210. The spring arm 211 has a rotary conductive wheel 301 mounted at its outer end. The wheel 301 serves as a feeler contact so that when the slot 210 is encountered and wheel 301 makes contact through the tape with conductive post 33 as seen on the right-hand side of FIG. 6. Conductive arm 211 is connected by conductor 213 and plug-in terminals 214 and 215 to one side of the power circuit. The other side of the power circuit extends to one side of the solenoid 192 which may be of the self locking type. The other side of solenoid 192 is connected to the post 33 so that when slot 210 in tape 30 arrives at that post, a current will be passed through solenoid 192 to operate the same. The other post 33′ on the left-hand side of the casing 11, as viewed in FIG. 6, has a similar structure 305 connected to the solenoid 193 to operate that solenoid in an identical manner. Tape 30 has, at its other end, a slot similar to the slot 210 to act in cooperation with the left-hand post 33′.

At the end of a record it might be desirable to stop the motor 180 as well as to re-position the drive means. For this purpose the switch 102 may be connected to one conductive post so as to be thrown into its "Off" position when the conductive wheel contacts the conductive post. In this position switch 102 breaks the contact with motor 180 and the motor is shut off. Since the simultaneously energized solenoid has automatically re-positioned the drive means, the operator would only have to place the switch 102 into the "Play" position and start the motor to continue playing of the magnetic tape recording.

The tape can be provided with two recording tracks, one located above the other but running in opposite directions so that the magnetic heads which are staggered will play one recording when the tape is being wound in one direction and another recording when the tape is being wound in the reverse direction.

The front panel of casing 10 is provided for this purpose with a reversing switch 134 (FIG. 2). This switch is connected to both the solenoids 192 and 193, for the purpose to be herein described.

When the record tape is being played, it is often desirable in the middle of the tape to reverse the direction. This might be desired in order to replay a portion of the tape which has just been played or to immediately turn to the other recording which is played when the tape moves in the reverse direction. In either case or for either purpose the direction of the tape may be changed by throwing the switch 134. The normal position of switch 134 would be with its pointer, directed towards the intermediate "N" or neutral position, as shown in FIG. 2.

Assuming that the tape was moving in one direction, generally speaking from right to left, and it was desired to reverse the direction of the tape, the switch 134 would merely be manually operated to push it to the position marked "R" (right). This would energize the solenoid 193 which would perform the function herebefore described for repositioning the roller drive 22. The roller drive would then engage the reel 32 to reverse the direction of the movement of the tape to go from left to right. The switch 134 is of the type which automatically re-positions itself to the neutral position, so as to be ready for further operation. It is therefore seen that by the use of this reversing switch 134, the direction of the tape can be changed alternately from one direction to the other, at any time during the playing of the machine, by the operation of this switch on the solenoids 192 and 193.

The operation of the apparatus is as follows. After a record casing 11 has been positioned on main casing 10 and locked into position and the power switch 101 put on, the record player will be started by placing the switch 102 in its "Play" position. The record player will then continue to play until slot 210 in the end of the record tape 30 come into contact with either the post 33 or 33' depending upon the direction in which the tape is being run. By the means heretofore described, the slot cooperating with the rotary conductor wheel will automatically reposition the drive wheel 22. The same reversing operation can be provided for simply by a movement of the reversing switch 134 either to the left "L" or to the right ("R") depending upon the direction desired.

I have described what I believe to the best embodiments of my invention. I do not wish however to be confined to the embodiments shown but what I desire to cover by Letters Patent is set forth in the appended claims.

I claim:

1. A magnetic tape reproducing machine, comprising a housing having a first external top wall and a second external wall, a magnetic pick-up head mounted in register with an opening in said second external wall, a motor within said housing, a removable magnetic tape container having top, bottom and side walls, a pair of reels in said container, a pair of mounting means one for each of said reels freely rotatably mounting said reels about parallel axes in said container, a magnetic tape mounted on said reels so that the tape is adapted to be wound on one reel as it is unwound from the other reel, first drive means connected to said motor, a pair of second drive means one connected to each of said reel mounting means adatped to engage said first drive means for rotating the reel so engaged, said second drive means being substantially completely contained within said magnetic tape container and said first drive means extends within an opening of said container during normal operation, shifting means adapted to engage said first drive means with either of said second drive means, means for locking said record container in abutment with said first and second external walls of said housing, means for preventing free rotation of said reels unless actively driven by engagement of said first and either of said second drive means and means for holding a portion of the tape slidably against the magnetic head when said record container is in its abutting position with respect to the external walls of said housing.

2. A magnetic tape reproducing machine according to claim 1, wherein said first drive means includes a drive wheel, a stub shaft, a frictional rim peripherally surrounding said drive wheel, said drive wheel being mounted on said stub shaft, a pulley mounted on said stub shaft fixed to said drive wheel, and a belt connecting said pulley to said motor.

3. A magnetic tape reproducing machine according to claim 2, wherein said shifting means includes a pair of solenoids, a pair of links adapted so that one link is affixed to each solenoid, an axle, a shifter plate supporting said first drive means connected to said axle and a pin affixed to the other end of said shifter plate connected to both of said solenoid links.

4. A magnetic tape reproducing machine according to claim 2, wherein each of said mounting means includes a reel, a flange on said reel outwardly extending from the bottom portion thereof, a sleeve supported on said reel flange, a bushing extending through said reel, a first bearing stud engaging the upper extremity of said bushing, said first bearing stud being mounted in a first bearing on said top record container wall, a second bearing stud engaging the lower extremity of said bushing, said second bearing stud mounted in a second bearing affixed to the bottom wall of said record container and a third bearing affixed to the bottom of said reel supporting said reel for free rotation about the axes formed by said first and said second bearing studs, said third bearing, being itself supported on the bearing surface of said second bearing and wherein said second drive means includes a frictional rim peripherally surrounding said third bearing.

5. A magnetic tape reproducing machine according to claim 4, including an opening in said first external wall adapted to allow said drive wheel to extend upwardly above said first external wall, and an opening in the bottom wall of said record container adapted to allow said drive wheel to protrude into said record container whereby said drive wheel will engage said second drive means.

6. An assembly according to claim 5, including switch means for controlling the driving of said reels and means near both ends of said tape for operating said switch means.

7. A magnetic tape reproducing machine according to claim 6, wherein the means at the end of said tape for operating said switch means is a slot extending longitudinally of said tape and intermediate the edges thereof.

8. A magnetic tape reproducing machine according to claim 6, wherein said switch means includes a conductive post on one side of said magnetic tape, a movable switch arm adapted to engage the other side of said tape, said switch arm having a feeler portion which is narrower than the slot in said tape and an electrical conductor connected to said switch arm.

References Cited in the file of this patent

UNITED STATES PATENTS

| | | |
|---|---|---|
| 2,032,190 | Thomas | Feb. 25, 1936 |
| 2,135,026 | Becker | Nov. 1, 1938 |
| 2,424,697 | Lear | July 29, 1947 |
| 2,477,146 | Scherbatskoy | July 26, 1949 |
| 2,574,218 | Lynch | Nov. 6, 1951 |
| 2,612,565 | Heller | Sept. 30, 1952 |
| 2,681,950 | Owens | June 22, 1954 |
| 2,702,834 | Golk et al. | Feb. 22, 1955 |
| 2,768,244 | Tiger | Oct. 23, 1956 |
| 2,778,636 | Eash | Jan. 22, 1957 |
| 2,778,880 | Eash | Jan. 22, 1957 |